United States Patent [19]
Wellman et al.

[11] 3,889,879
[45] June 17, 1975

[54] INTERNAL COMBUSTION ENGINE LIQUID COOLING SYSTEM

[75] Inventors: Ellis M. Wellman, Chardon; Luis Moreiras, Northfield, both of Ohio

[73] Assignee: The Weatherhead Company, Cleveland, Ohio

[22] Filed: May 13, 1974

[21] Appl. No.: 469,250

[52] U.S. Cl. ....... 237/12.3 B; 123/41.08; 123/41.29; 123/41.31; 137/625.49
[51] Int. Cl. .............................................. B60h 1/06
[58] Field of Search ............ 237/12 3 B, 8 A; 123/41.08, 41.29, 41.31, 41.51; 137/625.49

[56]  References Cited
UNITED STATES PATENTS

| | | | |
|---|---|---|---|
| 1,751,061 | 3/1930 | Terbeest | 137/625.49 X |
| 2,006,431 | 7/1935 | Aske | 237/12.3 B |
| 2,277,814 | 3/1942 | Booth | 237/8 A X |
| 2,762,570 | 9/1956 | Zimmerman | 237/8 A |
| 3,243,118 | 3/1966 | Walker | 237/12.3 B |
| 3,498,332 | 3/1970 | Lybrook | 237/8 A |

*Primary Examiner*—William E. Wayner
*Assistant Examiner*—W. E. Tapolcai, Jr.
*Attorney, Agent, or Firm*—McNenny, Farrington, Pearne & Gordon

[57] ABSTRACT

An internal combustion engine liquid cooling system is disclosed which includes a pump driven by the engine, a radiator for cooling the liquid in the system, a cabin heat exchanger for heating the cabin of the motor vehicle which is driven by the engine, an accessory heat exchanger for cooling an accessory such as an air compressor, and a unique combination liquid conditioner and flow control valve.

20 Claims, 2 Drawing Figures

INTERNAL COMBUSTION ENGINE LIQUID COOLING SYSTEM

BACKGROUND OF THE INVENTION

Internal combustion engines, and in particular diesel engines for on and off the road motor vehicles, frequently utilize the liquid coolant of the engine for secondary purposes such as cooling an air compressor and heating the cabin of the vehicle. Such systems also frequently include a conditioner which filters solid impurities from the liquid coolant and which chemically treats the liquid coolant.

In such systems, several flow control valves may be provided in the circuit to alter the flow of liquid coolant under various conditions. One such valve may be provided to open the flow of fluid to the cabin heat exchanger for the vehicle during winter operation and to close the flow of fluid to the cabin heat exchanger for summer operation. If there are two heat exchangers in the cabin, one such valve may be provided for each of the cabin heatt exchangers. Another such valve may be provided for partially closing the flow of fluid to an air compressor heat exchanger during winter operation so that maximum flow is available to the heater and for providing full flow to the air compressor heat exchanger for maximum cooling of the air compressor during summer operation. Still other valves may be provided at the inlet and at the outlet of the conditioner to close off the conditioner from the rest of the circuit to prevent the loss of liquid coolant from the system when the conditioner is being replaced.

Although such prior art liquid cooling systems have received wide commercial acceptance, they are subject to the disadvantage that the operator must know the location of all of these valves and must properly open or close or partially open or partially close these valves for summer operation or for winter operation or for servicing the conditioner. If a mistake is made in the operation of these various randomly located valves, the result may be insufficient or excessive flow of fluid to the various components of the system.

SUMMARY OF THE INVENTION

The present invention provides a convenient and mistakeproof internal combustion engine liquid cooling system in which a conditioner and flow control valve are combined in a unique manner so that a single flow control valve connects the system for summer operation or for winter operation or for servicing the conditioner.

In the presently preferred embodiment, the liquid cooling system according to this invention is utilized in a motor vehicle and includes a pump having an inlet and an outlet, a radiator, a cabin heat exchanger having an inlet and an outlet, an accessory heat exchanger having an inlet and an outlet, a conditioner having an inlet and an outlet, and a flow control valve.

The flow control valve is movable to a summer position and to a winter position and to a service position. When the flow control valve is in the summer position, the flow control valve closes fluid pressure communication between the pump outlet and the cabin heat exchanger inlet and establishes fluid pressure communication between the pump outlet and the accessory heat exchanger inlet and establishes fluid pressure communication between the pump outlet and the water conditioner inlet. When the flow control valve is in the winter position, the flow control valve establishes fluid pressure communication between the pump outlet and the cabin heat exchanger inlet and establishes fluid pressure communication between the pump outlet and the accessory heat exchanger inlet and establishes fluid pressure communication between the pump outlet and the water conditioner inlet. When the flow control is in the service position, the flow control valve closes fluid pressure communication between the water conditioner inlet and outlet and the remainder of the liquid cooling system to prevent loss of coolant when the water conditioner is periodically serviced.

The flow control valve includes a valve body having a bore extending axially therethrough. A heater section is disposed at one end of the bore, a conditioner section is disposed at the other end of the bore, and an intermediate section is disposed along the bore between the heater section and the conditioner section. This configuration permits all of the required openings and closings of fluid pressure communication to be accomplished by a simple straight line axial movement of a valve spool when the valve spool is moved to the summer position and to the winter position and to the service position.

BRIEF DESCRIPTION OF THE DRAWINGS

These and other aspects and advantages of the present invention are present in the preferred embodiment of the invention shown in the drawings, wherein.

DETAILED DESCRIPTION OF THE DRAWINGS

Structure

Figure 1:
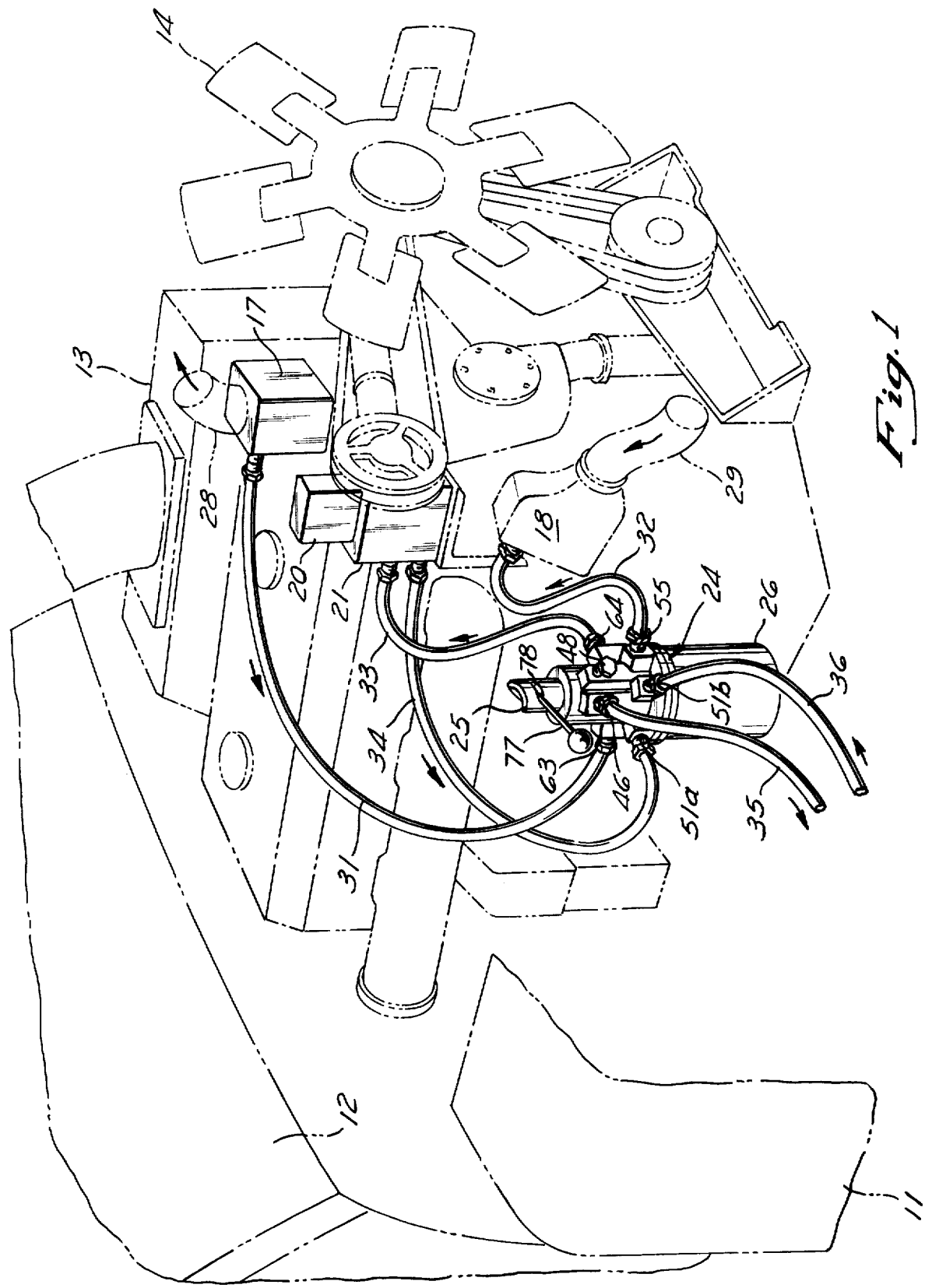
FIG. 1 is a schematic perspective view of the presently preferred embodiment of an internal combustion engine liquid cooling system according to the principles of the invention.

Referring now the drawings in greatr detail, FIG. 1 shows the presently preferred embodiment of an internal combustion engine liquid cooling system according to the principles of the invention. The cooling system is utilized in a large diesel engine driven motor vehicle, and portions of the motor vehicle have been removed for clarity. The motor vehicle includes a right front fender 11, a front windshield 12 behind which is located the passenger cabin of the vehicle, and a diesel engine 13. A conventional radiator (not shown in the drawings so that other portions of the cooling system can be more easily seen) is mounted on the motor vehicle immediately in front of a fan 14 driven by the diesel engine 13. The fan 14 draws air through the radiator to cool the liquid circulated through the radiator in a manner described below.

The diesel engine 13 also includes a liquid coolant pump driven by the diesel engine 13 for circulating liquid through the radiator and through internal passages in the diesel engine 13 and through the remaining portions of the cooling system shown in FIG. 1. The pump of the diesel engine 13 includes an outlet or high pressure side 17 and an inlet or low pressure side 18. The pump circulates liquid through the system by pumping the liquid from the inlet side 18 to the outlet side 17.

Although the system shown in FIG. 1 illustrates a single location for the pump outlet 17 and for the pump inlet 18, the pump outlet 17 and the pump inlet 18 could alternatively each include two or more spaced apart ports on the engine 13.

Also shown in FIG. 1 is an accessory 20 which is an air compressor for supplying air for the air brakes of the vehicle. The air compressor 20 is driven by the diesel engine 13. Because the air compressor 20 generates heat when it is operating, a heat exchanger 21 is provided in the air compressor 20 for cooling the air compressor and preventing overheating. Also shown in FIG. 1 is a combination unit 24 which includes a flow control valve 25 and a liquid conditioner 26 combined in an integral unit.

When the diesel engine 13 is operating, a portion of the liquid in the system flows from the pump outlet 17, through a large diameter upper radiator hose 28, through the radiator, and returns to the pump inlet 18 through a large diameter lower radiator hose 29. Another portion of the liquid coolant in the system flows from the pump outlet 17 to the flow control valve 25 and flows from the control valve 25 to the pump inlet 18 through the lines 31 and 32, respectively. Fluid flows from the flow control valve 25 to the accessory heat exchanger 21 and from the accessory heat exchanger 21 to the flow control valve 25 through lines 33 and 34, respectively. Fluid flows from the flow control valve 25 to a cabin heat exchanger (not shown) and returns from the cabin heat exchanger to the flow control valve 25 through the lines 35 and 36, respectively.

Figure 2:
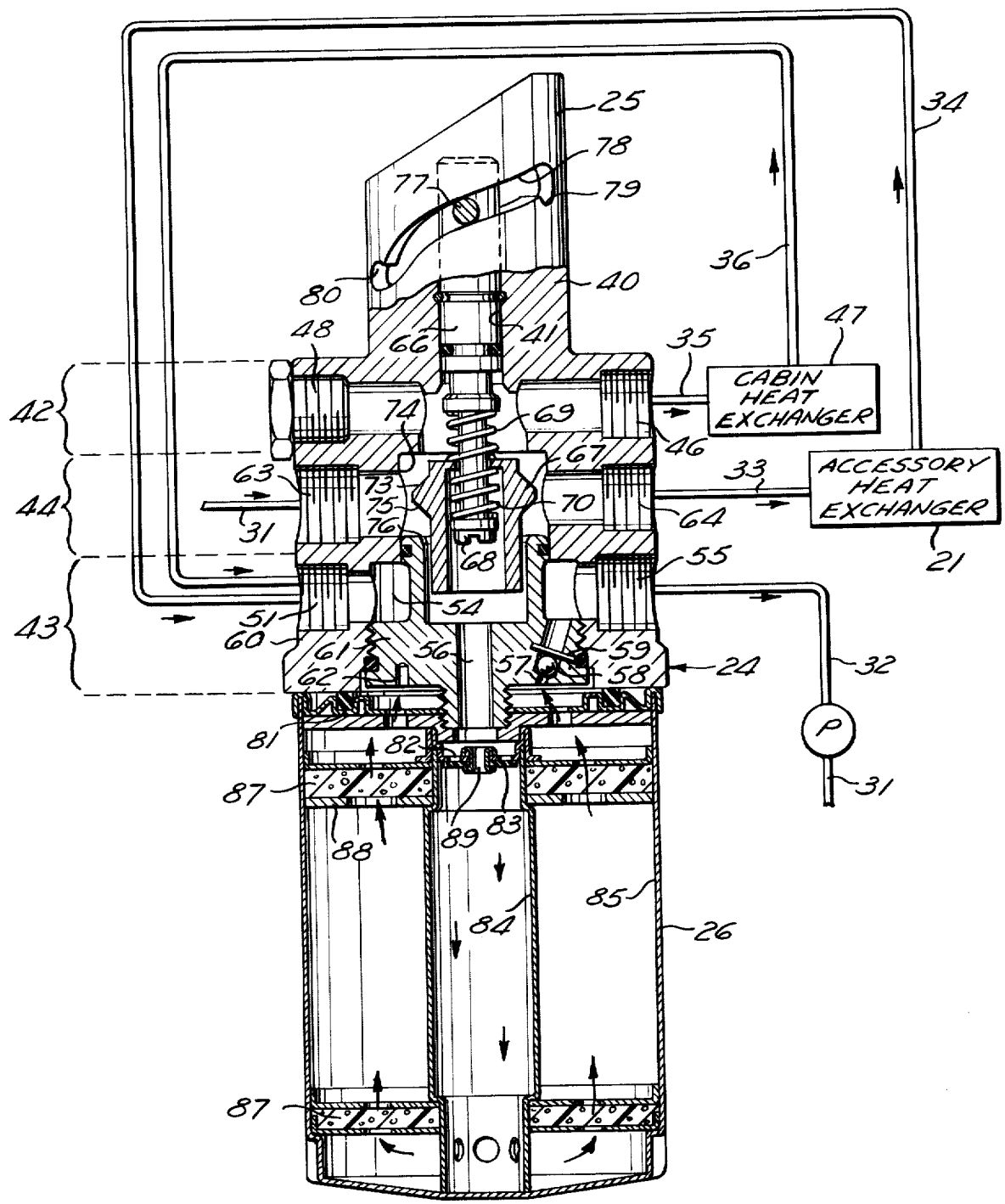
FIG. 2 is a cross-sectional side elevational view of the combination flow control valve and liquid conditioner shown in FIG. 1, with the cooling system shown schematically and with the various ports of the control valve disposed in a single plane so that they can be seen in a single drawing.

The structural details and mode of operation of the combination unit 24 can best be understood by particular reference to FIG. 2. For purposes of clarity, the various ports shown on the control valve 25 in FIG. 1 are shown as lying in a single axially extending plane in FIG. 2 so that all such ports can be seen in one view. In actual practice of the invention, however, the ports are circumferentially spaced as shown in FIG. 1 to provide the greatest amount of metal between the ports for maximum strength.

As shown in FIG. 2, the flow control valve 25 includes a valve body 40 which is of a machined aluminum casting in the preferred embodiment but which alternatively may be of any other suitable material. A bore 41 extends from end to end axially through the valve body 40.

A heater section 42 is disposed at the upper end of the axial bore 41, a conditioner section 43 is disposed at the lower end of the axial bore 41, and an intermediate section 44 is disposed along the axial bore 41 between the heater section 42 and the conditioner section 43.

The heater section 42 includes a cabin heater supply port 46 extending radially outwardly from the axial bore 41 and hydraulically connected to the cabin heat exchanger (not shown). The cabin heat exchanger is a conventional radiator type heat exchanger for warming the air in the passenger cabin of the motor vehicle. The heater section 42 of the flow control valve 25 also includes a second cabin heat exchanger outlet port 48 extending radially outwardly from the axial bore 41. The second cabin heat exchanger supply port 48 is plugged as shown in FIG. 2 and is provided for trucks in which two separate cabin heat exchangers are utilized.

The conditioner section 43 of the flow control valve 25 includes a cabin heat exchanger and accessory heat exchanger return port 51 for receiving fluid from the cabin heat exchanger 47 and from the accessory heat exchanger 21. Although the return port 51 is shown as a single port in FIG. 2 of the drawings for clarity in showing all ports in a single view, the return line 34 from the accessory heat exchanger 21 is connected to an accessory return port 51a (FIG. 1) while the return line 36 from the cabin heat exchanger 47 is connected to a cabin heat exchanger return port 51b (FIG. 1). The ports 51a and 51b each extend radially outwardly from an annular cavity 54 of the axial bore 41, so that return flow from the lines 34 and 36 is mixed together in the annular cavity 54. The conditioner section 43 also includes a pump supply port 55 which returns fluid through the line 32 to the inlet side 18 of the pump of the diesel engine 13.

The conditioner section 43 of the valve body 40 also includes a conditioner supply port 56 extending axially from the bore 41. An axially extending conditioner return port 57 is also provided in the conditioner section 43 to permit flow of fluid from the conditioner 26 to the pump supply port 55. A one-way ball type check valve 58 is disposed between the conditioner return port 57 and the pump supply port 55 to prevent reverse flow of fluid from the pump supply port 55 when the conditioner 26 is being changed. A suitable pin 59 is provided to retain the ball type check valve in place as shown in FIG. 2.

The intermediate section 44 of the valve body 40 includes a pump return port 63 extending radially outwardly from the bore 41 for receiving liquid coolant from the pump outlet 17 and an accessory supply port 64 extending radially outwardly from the bore 41 for supplying liquid coolant to the accessory heat exchanger 21. Although not shown in the drawings for simplicity, other accessory supply ports circumferentially spaced from port 64 can also be provided in the intermediate section 44 for supplying coolant to other accessory heat exchangers on the vehicle.

As further shown in FIG. 2, the valve body 40 includes a one piece main housing 60 and a plug 61 received within the lower end of the main housing 60. The bore 41 of the main housing 60 includes a larger diameter portion which cooperates with a smaller diameter portion of the plug 61 to define the annular cavity 54. This arrangement simplifies machining of the flow control valve 25 and simplifies assembly of the various components. Two blind bores 62, one of which may be seen in FIG. 2, are provided in the plug 61 for receiving a suitable tool for tightening the plug 61 in the main housing 60.

A valve spool means is slidably disposed in the bore 41 and includes a valve stem 66 and a bidirectionally spring biased valve plunger 67 carried by the stem 66. A pan head screw 68 secures the plunger 67 on the stem 66. Two coil springs 69 and 70 hold the plunger 67 in a position on the stem 66 shown in FIG. 2 and provide a biasing force to ensure proper seating as described below. The plunger 67 includes an upwardly facing valving surface 73 for engaging a valve seat 74 and a downwardly facing valving surface 75 for engaging a valve seat 76 when the valve stem 66 is moved upwardly or downwardly respectively from its center position shown in FIG. 2.

The valve stem 66 as illustrated in FIG. 2 is shown in its midway or center position. For reasons described below, this is also described as the winter position for the valve stem 66. To move the valve stem 66 axially in the bore 41, a handle 77 which is rigidly secured to the valve stem 66 is rotated. The handle 77 rides in a cam slot 78 in the valve body 40, so that rotation of the handle 77 and valve stem 66 to move upwardly and downwardly as viewed in FIG. 2. As shown in FIG. 2, a suitable C-shaped snap ring is provided in the bore 41 in a well-known manner to engage a suitable annular groove in the valve stem 66 to hold the valve stem 66 in its midway or winter position. When the handle 77 is rotated to the right as viewed in FIG. 2, the C-shaped snap ring snaps out of the groove in the valve stem 66, and the valve stem 66 and handle 77 move upwardly until the upper most end of the cam slot 78 is reached. Slightly before this upper most position in the cam slot 78 is reached, the valving surface 73 engages the valve seat 74 for purposes described below so that the valve plunger 67 is restrained against axial movement. Final movement of the handle 77 to its uppermost position in the slot 78 causes the valve stem 66 and screw 68 to move upwardly and compress the spring 69 so that the spring 69 resiliently urges the valving surface 73 against the valve seat 74. This ensures adequate seating between the valve elements 73 and 74, and prevents over tightening thereof. Additionally, because the uppermost end of the cam slot 78 is provided with a slight notch 79, the bias of the spring 69 holds the handle 77 in the uppermost position in the notch 79. This uppermost position may be termed a summer position for reasons discussed below.

In a similar manner, when the handle 77 is rotated to the left as viewed in FIG. 2 the handle 77 and valve stem 66 move axially downwardly. Before the lower most position in the cam slot 78 is reached, the valving surface 75 engages the valve seat 76 for reasons described below. Further movement of the handle 77 to its lowermost position in the cam slot 78 compresses the spring 70, and the spring 70 acts in a manner similar to the spring 69 to ensure an adequate but not excessive force of the valving surface 75 against the valve seat 76 and holds the handle 77 in a suitable notch 80 in the lowermost position in the cam slot 78. This lowermost position may be termed a service position as described below.

The coolant conditioner 26 of the combination unit 24 shown in FIG. 2 is a disposable can type conditioner which is adapted to be discarded after use and replaced with a new conditioner. The conditioner 26 is threadably received on the plug section 61, and a suitable seal 81 prevents fluid leakage between the flow control valve 25 and the conditioner 26. Fluid enters the inlet side of the conditioner 26 from the conditioner supply port 56, flows through suitable passages 82, and displaces a flexible elastomeric ring or washer 83. Such fluid then flows through a center tube 84 in the direction of the arrows shown in FIG. 2 and enters the bottom of an annular cavity which is located between the tube 84 and an outer casing 85. An annular washer shaped open cell urethane foam filter element 87 is provided at the top and at the bottom of such annular cavity, and the space between the filter elements 87 is filled with a coolant conditioner chemical.

The composition of the conditioner chemical is well-known in the art and may be of either the type 1 or chromate type or alternatively of the type 2 or borate type. Various compositions for these chemicals are provided in the publication titled "Corrosion of Materials by Ethylene Glycol-Water" by Jackson, Miller, Fink, and Boyd, Defense Metals Information Center Report 216, May 10, 1965, Battelle Memorial Institute, Columbus, OH 43201, U.S.A. The chromate or type 1 chemical composition presently preferred by applicant consists of the following:

| Content | Weight (grams) |
|---|---|
| Sodium Chromate | 240 |
| Sodium Nitrite | 20 |
| Sodium Phosphate (Monobasic) | 20 |
| Sodium Phosphate (Dibasic) | 20 |
| Cation Resin | 100 |

The type 2 or borate type chemical composition presently preferred by applicant consists of the following:

| Content | Weight (grams) |
|---|---|
| Sodium Tetraborate | 280 |
| Sodium Metasilicate | 10 |
| Mercaptobenzothiazole | 10 |
| Cation Resin | 100 |

The conditioner 26 also includes an annular washer shaped ring 88 of commercially pure magnesium which provides an anodic-cathodic protection to inhibit corrosion of other metal components in the system in a well-known manner.

It is necessary that the flow rate through the conditioner 26 be relatively low so that the chemicals contained therein are used gradually as the vehicle is driven. To accomplish this, the conditioner return port 57 is of small diameter to provide a restrictive orifice which limits the flow of fluid through the conditioner 26.

It is noted that disposable can type coolant conditioners are presently used in prior art motor vehicle cooling systems wherein the flow of fluid through such conditioners is opposite the direction of flow through the conditioner 26 shown in the drawings. To prevent mishap in the event the conditioner 26 is used in such prior art cooling systems apart from use in a reconstructed system incorporating the combination unit 24, the water conditioner 26 is arranged so that flow therethrough can be in a direction opposite that shown in FIG. 2. In this event, the elastomeric washer 83 seals the passages 82 so that flow out of the conditioner can only pass through a restrictive orifice 89. The restrictive orifice 89 under these conditions of reverse flow limits the flow of fluid through the water conditioner for the purposes described above.

Operation

Turning now to the operation of the cooling system shown in FIGS. 1 and 2, the winter mode of operation of the cooling system will first be explained. With the valve stem 66 and valve plunger 67 in its intermediate or winter position shown in FIG. 2, liquid coolant from the pump enters the pump return port 63. Most of the fluid received in the pump return port 63 is directed to the cabin heat exchanger 47 through the cabin heat exchanger supply port 46 and to the accessory heat exchanger 21 through the accessory supply port 64. This assures adequate flow for heating the cabin heat exchanger 47 and for cooling the accessory heat exchanger 21. A smaller portion of the fluid received in the pump return port 63 flows downwardly through the conditioner supply port 56 and through the conditioner 26 in the manner described above. Only a small amount of fluid flows in this direction through the conditioner 26, because of the small size of the liquid conditioner return port 57.

With the valve stem 66 and plunger 67 in this winter position, fluid is also received by the control valve 25 at the accessory return port 51a and at the cabin heat exchanger return port 51b. This fluid is mixed in the annular cavity 54 with the coolant which has passed through the liquid conditioner 26 and through the conditioner return port 57. The mixed fluid in the annular cavity 54 then returns to the pump through the pump supply port 55, and the pump returns the fluid to the pump return port 63 to complete the circuit.

When the handle 77 is moved upwardly in the cam slot 78 so that it is received in the notch 79, the flow control valve 25 is in its summer position and the valving surface 73 is resiliently urged against the valve seat 74 by the spring 69. This closes fluid pressure communication between the pump return port 63 and the cabin heat exchanger supply port 46, so that fluid flow to the cabin heat exchanger 47 is terminated. Because flow to the cabin heat exchanger 47 is terminated, and further because only a small amount of fluid can flow through the coolant conditioner supply port 56 for reasons described above, more liquid is available to the accessory supply port 64 for the accessory heat exchanger 21. In this manner, the system terminates flow of fluid to the cabin heat exchanger and increases flow of fluid to the accessory heat exchanger during the warmer summer months.

Turning now to the operation of the cooling system when the handle 77 is in its lowermost position in the cam slot 78 and is received and held in the notch 80 as described above so that the system is in its service position, it should be understood that this service position is normally used only when the diesel engine 13 is not running and when it is desired to change the disposable coolant conditioner 26. With the handle 77 in this position, the valving surface 75 engages the valve seat 76 with a light biasing force as described above. This hydraulically isolates the pump return port 63, accessory supply port 64, and cabin heat exchanger supply port 46 from the conditioner supply port 56. This prevents any fluid loss from the cooling system when the filter 26 is removed. During this portion of the operation of the valve, the ball type check valve 58 isolates the ports 51a, 51b and 55 from the conditioner return port 57. In this manner the coolant conditioner supply port 56 and the coolant conditioner return port 57 are hydraulically isolated from the remainder of the system so that coolant cannot escape from the system when the conditioner 26 is changed. The conditioner 26 is then threadably disengaged from the flow control valve 25 and discarded, and a new coolant conditioner is threadably secured in its place. After installation of the new coolant conditioner, the handle 77 is returned to either its summer position or its winter position for operation of the cooling system.

What is claimed is:

1. A motor vehicle liquid cooling system comprising a pump having an inlet and an outlet, a radiator, a cabin heat exchanger having an inlet and an outlet, a liquid conditioner having an inlet and an outlet, and a flow control valve, said flow control valve being a multiple port valve having a cabin supply port hydraulically connected to said cabin heat exchanger inlet and a liquid conditioner supply port hydraulically connected to said liquid conditioner inlet, said flow control valve being movable to a summer position and to a winter position and to a service position, said flow control valve including valve means establishing fluid pressure communication between said pump outlet and said cabin heat exchanger inlet and establishing fluid pressure communication between said pump outlet and said liquid conditioner inlet when said flow control valve is in said winter position, said valve means closing fluid pressure communication between said pump outlet and said cabin heat exchanger inlet and establishing fluid pressure communication between said pump outlet and said liquid conditioner inlet when said flow control valve is in said summer position, and said valve means closing fluid pressure communication between said pump outlet and said liquid conditioner inlet when said flow control valve is in said service position.

2. A motor vehicle liquid cooling system as defined in claim 1 wherein said flow control valve and said liquid conditioner are combined in a single integral unit.

3. A motor vehicle liquid cooling system as defined in claim 2 wherein said multiple ports of said flow control valve include a conditioner return port hydraulically connected to said liquid conditioner outlet and a pump supply port hydraulically connected to said pump inlet, and said pump supply port is hydraulically connected to said conditioner return port.

4. A motor vehicle liquid cooling system as defined in claim 2 including an accessory heat exchanger having an inlet and an outlet, said multiple ports of said flow control valve including an accessory supply port hydraulically connected to said accessory heat exchanger inlet, and said valve means establishes fluid pressure communication between said pump outlet and said accessory heat exchanger inlet when said flow control valve is in said summer position and when said flow control valve is in said winter position.

5. A motor vehicle liquid cooling system comprising a pump having an inlet and an outlet, a radiator, a cabin heat exchanger having an inlet and an outlet, an accessory heat exchanger having an inlet and an outlet, a flow control valve, and fluid connection means hydraulically connecting said pump and radiator and cabin heat exchanger and accessory heat exchanger and flow control valve, said flow control valve being a multiple port valve having a cabin supply port hydraulically connected to said cabin heat exchanger inlet and an accessory supply port hydraulically connected to said accessory heat exchanger inlet, said flow control valve being movable to a summer position and to a winter position, said flow control valve including valve means establishing fluid pressure communication between said pump outlet and said cabin heat exchanger inlet and establishing fluid pressure communication between said pump outlet and said accessory heat exchanger inlet when said flow control valve is in said winter position, and said valve means closing fluid pressure communication between said pump outlet and said cabin heat exchanger inlet and establishing fluid pressure communication between said pump outlet and said accessory heat exchanger inlet when said flow controll valve is in said summer position.

6. A motor vehicle liquid cooling system as defined in claim 5 including a liquid conditioner having an inlet and an outlet, said multiple ports of said flow control valve including a liquid conditioner supply port hydraulically connected to said liquid conditioner inlet, said flow control valve being movable to a service position, said valve means hydraulically isolating said pump outlet from said liquid conditioner inlet when said flow control valve is in said service position, and said flow control valve and said liquid conditioner being combined together in a single integral unit.

7. A motor vehicle liquid cooling system as defined in claim 6 wherein said multiple ports of said flow control valve include a conditioner return port hydraulically connected to said liquid conditioner outlet, said multiple ports of said flow control valve include a pump supply port hydrulically connected to said pump inlet, and said pump supply port is hydraulically connected to said conditioner return port.

8. A motor vehicle liquid cooling system as defined in claim 7 wherein said multiple ports of said flow control valve include an exchanger return port hydraulically connected to at least one of said heat exchanger outlets, and said exchanger return port is hydraulically connected to said pump supply port.

9. In a motor vehicle liquid cooling system, a control valve comprising a valve body, a bore extending through said valve body, a heater section disposed at one end of said bore, a conditioner section disposed at the other end of said bore, an intermediate section disposed along said bore between said heater section and said conditioner section, and valve spool means axially movable in said bore to a summer position and to a winter position and to a service position; said intermediate section including a pump return port hydraulically connected to said bore and an accessory supply port hydraulically connected to said bore; said heater section including a cabin heat exchanger supply port hydraulically connected to said bore, said valve spool means opening fluid pressure communication between said pump return port and said cabin heat exchanger supply port when said valve spool means is in said winter position; said valve spool means closing fluid pressure communication between said pump return port and said cabin heat exchanger supply port when said valve spool means is in said summer position; said conditioner section including a conditioner supply port hydraulically connected to said bore, said valve spool means opening fluid pressure communication between said pump return port and said conditioner supply port when said valve spool means is in said summer position and when said valve spool means is in said summer position and when said valve spool means is in said winter position, said valve spool means closing fluid pressure communication between said pump return port and said conditioner supply port when said valve spool means is in said service position.

10. A control valve as defined in claim 9 including a fluid conditioner, said fluid conditioner and said flow control valve being combined together in a single integral unit, and said fluid conditioner having an inlet hydraulically connected to said conditioner supply port.

11. A control valve as defined in claim 10 wherein said conditioner section includes a pump return port, and said fluid conditioner includes an outlet hydraulically connected to said pump return port.

12. A control valve as defined in claim 9 wherein said conditioner section includes a pump supply port and a conditioner return port hydraulically connected to one another.

13. A control valve as defined in claim 12 including a one-way check valve interposed between said pump supply port and said conditioner return port preventing flow in a direction from said pump supply port to said conditioner return port.

14. A control valve as defined in claim 12 wherein said conditioner section icludes at least one accessory return port hydraulically connected to said pump supply port.

15. A control valve as defined in claim 9 wherein said bore extends axially through said body, and said pump return port and accessory supply port and cabin heat exchanger supply port each extend radially outwardly from said bore.

16. A control valve as defined in claim 15 wherein said conditioner supply port extends axially from said other end of said bore.

17. A control valve as defined in claim 16 wherein said valve body includes a first valve seat in said bore between said pump return port and said cabin heat exchanger supply port and a second valve seat in said bore between pump return port and said conditioner supply port.

18. An internal combustion engine liquid cooling system comprising a pump having an inlet and an outlet, a radiator, a heat exchanger having an inlet and an outlet, a liquid conditioner having an inlet and an outlet, and a flow control valve, said flow control valve and liquid conditioner being combined in a single integral unit, said flow control valve being a multiple port valve having a heat exchanger supply port hydraulically connected to said heat exchanger inlet and a liquid conditioner supply port hydraulically connected to said liquid conditioner inlet, said flow control valve being movable to a first position and to a second position and to a service position, said flow control valve including valve means establishing fluid pressure communication between said pump outlet and said heat exchanger inlet and establishing fluid pressure communication between said pump outlet and said liquid conditioner inlet when said flow control valve is in said second position, said valve means closing fluid pressure communication between said pump outlet and said heat exchanger inlet and establishing fluid pressure communication between said pump outlet and said liquid conditioner inlet when said flow control valve is in said first position, and said valve means closing fluid pressure communication between said pump outlet and said liquid conditioner inlet when said flow control valve is in said service position.

19. An internal combustion engine liquid cooling system as defined in claim 18 wherein said multiple ports of said flow control valve include a conditioner return port hydraulically connected to said liquid conditioner outlet and a pump supply port hydraulically connected to said pump inlet, and said pump supply port is hydraulically connected to said conditioner return port.

20. An internal combustion engine liquid cooling system as defined in claim 18 including another heat exchanger having an inlet and an outlet, said multiple ports of said flow control valve including another heat exchanger supply port hydraulically connected to said other heat exchanger inlet, and said valve means establishes fluid pressure communication between said pump outlet and said other heat exchanger inlet when said flow control valve is in said first position and when said flow control valve is in said second position.

* * * * *

UNITED STATES PATENT OFFICE
CERTIFICATE OF CORRECTION

PATENT NO. : 3,889,879
DATED : June 17, 1975
INVENTOR(S) : Ellis M. Wellman & Luis Moreiras It is certified that error appears in the above-identified patent and that said Letters Patent are hereby corrected as shown below:

Column 1, line 21, "heatt" should be --heat--.

Column 2, line 43, "greatr" should be --greater--.

Column 9, line 54 and line 55, after the phrase "valve spool means is in said summer position and" please delete "when said valve spool means is in said summer position"

Signed and Sealed this sixteenth Day of September 1975

[SEAL]

Attest:

RUTH C. MASON
*Attesting Officer*

C. MARSHALL DANN
*Commissioner of Patents and Trademarks*